US007826066B2

(12) United States Patent
Primot et al.

(10) Patent No.: US 7,826,066 B2
(45) Date of Patent: Nov. 2, 2010

(54) COMPACT ACHROMATIC OPTICAL INTERFEROMETER OF THE THREE-WAVE LATERAL SHEARING TYPE

(75) Inventors: Jerome Primot, Chatillon (FR); Nicolas Guerineau, Antony (FR); Sabrina Velghe, Ville-bon-sur-yvette (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 175 days.

(21) Appl. No.: 12/218,671

(22) Filed: Jul. 17, 2008

(65) Prior Publication Data

US 2009/0201512 A1  Aug. 13, 2009

Related U.S. Application Data

(63) Continuation of application No. PCT/FR2007/050656, filed on Jan. 16, 2007.

(30) Foreign Application Priority Data

Jan. 20, 2006  (FR) ................... 06 00526

(51) Int. Cl.
*G01B 9/02* (2006.01)
(52) U.S. Cl. .................................... 356/521
(58) Field of Classification Search ............. 356/521; 250/237 G
See application file for complete search history.

(56) References Cited

U.S. PATENT DOCUMENTS

| 5,434,369 A | 7/1995 | Tempco |
| 5,606,417 A | 2/1997 | Primot |
| 6,577,403 B1 | 6/2003 | Primot |

FOREIGN PATENT DOCUMENTS

| FR | 2 682 761 | 4/1993 |
| FR | 2 712 978 | 6/1995 |
| FR | 2 795 175 | 12/2000 |

OTHER PUBLICATIONS

"Wavefront Sensor Prototype for Industrial Applications Based on a Three-Level Phase Grating", by Jerome Primot et al, Optics Engineering, Mar. 1997, pp. 901-904.

*Primary Examiner*—Tarifur Chowdhury
*Assistant Examiner*—Jonathon D. Cook
(74) *Attorney, Agent, or Firm*—Lawrence E. Laubscher, Sr.; Lawrence E. Laubscher, Jr.

(57) ABSTRACT

A method and a system for analyzing the wavefront of a light beam, wherein a diffraction grating is arranged in a plane perpendicular to the light beam to be analyzed and optically conjugated to the analysis plane. Different emerging beams of the grating interfere to generate an image having deformations linked to the gradients of the wavefront to be analyzed.

The method is characterized in that the grating carries out the multiplication of an intensity function which is implemented by a two-dimensional grating with hexagonal meshing of surface S transmitting the light of the beam to be analyzed into plural emerging beams arranged in a hexagonal meshing, by an phase function which is implemented by a two-dimensional grating with hexagonal meshing of surface 3S which introduces a phase shift close to $2\pi/3$ (modulo $2\pi$) between two adjacent secondary beams.

5 Claims, 5 Drawing Sheets

COMPACT ACHROMATIC OPTICAL INTERFEROMETER OF THE THREE-WAVE LATERAL SHEARING TYPE

CROSS-REFERENCE TO RELATED APPLICATIONS

This application is a continuation of the PCT International Application No. PCT/FR2007/050656 filed Jan. 16, 2007, which is based on the French Application No. 0600526 filed Jan. 20, 2006.

BACKGROUND OF THE INVENTION

1. Field of the Invention

This invention is provided for the analysis of the wavefront of a light beam.

Such a type of analysis makes it possible to test optical elements, to qualify optical devices, as well as to steer deformable optical components as used in active or adaptive optics. It also allows for the study of non directly measurable physical phenomena, such as variations of optical index within turbulent media that can be encountered when crossing the terrestrial atmosphere, as well as in a blower vein. It is also used for testing the planarity of electronic components, for example matrix focal planes, as well as for shaping power laser beams.

2. Description of Related Art

The type of analysis of a wavefront according to the invention is based on the use of a diffraction grating positioned on the path of the beam to be analyzed.

For a better understanding of the following, such a grating is defined as being an optical system introducing periodic variations of phase, intensity or phase and intensity. Any diffraction grating is thus characterized by the multiplication of two functions: the one, referred to as phase function, represents the periodical variations of phase introduced by the grating and the other one, referred to as intensity function, represents the periodical variations of intensity introduced by the grating.

The French patent application No. 2,712,978 (which corresponds with U.S. Pat. No. 5,606,417) discloses the mode of construction and definition of a two-dimensional grating. A set of points regularly arranged, according to two directions constitutes a planar meshing. Such points define an elementary mesh. The elementary mesh is the smallest surface allowing for a non-lacunary paving of the plane to be reached according to both directions defining the latter. The polygon of the elementary mesh is the minimal surface polygon having the sides thereof supported by the mediatrices of the segments connecting any point of the set with its nearest neighbors. A two-dimensional grating is the free repetition of an elementary pattern arranged according to a planar meshing. A planar meshing can define elementary meshes, being either hexagonal or rectangular (square meshes being only a special case for the latter).

When a diffraction grating is being illuminated with a light beam, referred to as an incident beam, light beams being diffracted by the grating, also called emerging beams, can be described using two equivalent approaches.

The first approach consists in considering emerging beams as replicas of the incident beam. These are called sub-beams, each corresponding to one diffraction order of the grating. Amongst such sub-beams, two categories are to be distinguished. First of all, there are classified sub-beams, referred to as main beams corresponding to the diffracted orders being used according to the invention. The other orders, being not useful for analysis, are called secondary sub-beams. The grating will be thus defined so as to favour the emergence of the main sub-beams and to minimize the presence of the secondary sub-beams.

The second approach consists in considering emerging beams as beams being diffracted by each mesh of the grating. These are called secondary beams.

When an intensity function is introduced by a grating, each secondary beam results from a mesh of the intensity grating called sub-pupil.

In the aforementioned French patent application No. 2,712,978, a three-wave lateral shearing interferometer implements a two-dimensional phase and/or intensity grating and a spatial filtering system. According to the approach through decomposition into sub-beams, the grating optically subdivides the incident beam to be analyzed into a plurality of sub-beams in a conjugated plane of the defect. A system for spatial filtering the sub-beams is intended to select three main sub-beams used for analysis. A particular optical processing of the three sub-beams obtained in this way makes it possible to observe an interferogram made of a hexagonal meshing of light spots having a contrast being invariant, whatever the selected observation plane is. This interferogram is sensitive to gradients of the wavefront and this with a continuous adjustment possibility for dynamics and sensitivity. The observation distance is there defined as the distance separating the selected observation plane from the so-called zero sensitivity plane, this latter being a conjugated plane conjugated with the plane of the grating located downstream the spatial filtering. Such a type of interferometer has the advantage of displaying important metrological qualities because of the frequency purity of the generated interferogram. Moreover, the measurement error can be estimated from the measurement itself. Finally, such an interferometer can operate with polychromatic light, provided the path difference of the defect to be detected does not depend on the wavelength.

On the other hand, it is complex to be implemented, because of the insertion of the spatial filtering system for selecting the main sub-beams between the grating and the observation plane of the interference fringe system. Moreover, the spatial filtering system brings limitations for measuring strongly disturbed light beams or light beams with a very large spectrum width.

The French patent application No. 2,795,175 (which corresponds to U.S. Pat. No. 6,577,403) discloses an interferometer of a four-wave lateral shear type being a development of the interferometer with a three-wave lateral shearing as being described hereinabove. The grating at the basis of such an interferometer optically subdivides, in a conjugated plane of the defect, the incident beam to be analyzed into four main sub-beams, useful for analysis. As secondary sub-beams are minor with a low amplitude, removing them by a spatial filtering system is not necessary. The interferogram comprises a rectangular meshing of light spots, the contrast of which is invariant, whatever the selected observation plane is. Like the interferometer of a three-wave lateral shearing type, such an interferometer can operate with polychromatic light and offers a continuously set sensitivity and dynamics by a simple translation of the observation plane with respect to the so-called zero sensitivity plane. Moreover, as opposed to the three-wave lateral shearing interferometer, the absence of a spatial filtering system offers a better implementing ease and makes it possible to measure strongly disturbed light beams or light beams with a very large spectrum width. Estimating the error is also possible by means of such an interferometer, however, it will be less robust in the case of the measurement of high dynamics defect. In addition, the sampling geometry of wavefronts to be analyzed in the four-wave lateral shearing type interferometer is less optimal than that achieved with a three-wave lateral shearing type interferometer.

Thus, it seems highly desirable to provide an interferometer combining, on the one hand, the implementing simplicity and the operating capacity, from highly disturbed low intensity light sources or light sources having a very large spectrum width of the four-wave lateral shearing type interferometer and, on the other hand, the possibility to estimate the measurement error robustly and the optimum sampling geometry of the wavefronts to be analyzed of the three-wave lateral shearing type interferometer.

OBJECT OF THE INVENTION

The object of the present invention is to provide a development in this respect.

SUMMARY OF THE INVENTION

The invention can be considered in the form of a method or a system.

The provided method is of the type wherein:

(a) a diffraction grating with two-dimensional meshing is arranged and carries out the multiplication of:
   (1) an intensity function which defines a hexagonal meshing of sub-pupils transmitting the light from the beam to be analyzed into a plurality of secondary beams arranged in a hexagonal meshing, by
   (2) a phase function, inside or in the vicinity of a first plane perpendicular to the light beam to be analyzed and optically conjugated to the analysis plane of the wavefront, resulting in a diffraction of the beam into different emerging beams, and (b) an image formed by the interference of the emerging beams is created and observed in a plane located at a chosen distance from the first plane, said image having deformations linked to the gradients of the wavefront to be analyzed.

According to one aspect of the invention, the phase function in (2) introduces a phase shift of a value close to $2\pi/3$ (modulo $2\pi$) between two adjacent secondary beams.

Thereby, the diffraction grating performing the multiplication of both functions thus defined diffracts a hexagonal meshing of secondary beams which propagate and interfere with each other so as to generate, in any observation plane parallel to the grating plane, an image in the form of a hexagonal meshing of light spots, the contrast of which is substantially independent from the wavelength as well as the observation distance.

In the approach consisting in considering the emerging beams as replicas of the incident beam, the phase function diffracts plural sub-beams including the three main sub-beams and secondary sub-beams. The multiplication by an intensity function makes it possible to minimize the energy being diffracted in the secondary sub-beams so that there essentially remain only the three main sub-beams, useful for the analysis.

The hexagonal meshing of light spots can be observed in the grating plane, i.e. the zero sensitivity plane. The meshing is advantageously observed from a plane located at an observation distance selected by the user as a function of the gradients of the wavefront to be analyzed and the desired dynamics.

Such a method operates with a polychromatic light and, while adjusting the observation distance, makes it possible, through a continuous setting of the sensitivity and dynamics of the system, to measure highly disturbed light beams.

Thus, the user has available a continuous setting flexibility in dynamics for the three-wave lateral shearing type interferometer without the implementing constraints linked to the insertion of the spatial filtering system.

The invention also provides systems likely to allow for implementing the proposed method. Such a system is of the type including:

(a) an input optics for optically conjugating a reference plane with a plane wherein the wavefront is analyzed, (b) a diffraction grating comprising an intensity grating with a hexagonal elementary mesh and a phase grating with a hexagonal elementary mesh, and arranged in said reference plane, perpendicularly to the light beam, resulting in a diffraction of the beam in different emerging beams referred to as secondary beams, and (c) means for observing the image formed by the interference of the emerging beams, said image having deformations linked to the gradients of the analyzed wavefront.

According to the invention, the system is characterized in that the grating of (b) includes:

the intensity grating having a hexagonal elementary mesh with a surface S where there is arranged an elementary intensity pattern with a surface S, and the phase grating having a hexagonal elementary mesh with a surface equal to three times the surface S, where there is arranged an elementary phase pattern having a surface equal to three times the surface S, all six apexes of a phase mesh matching with the apexes located at one of the ends of the six small diagonals of three adjacent intensity meshes, the other end of said small diagonals being located at the common apex of said three adjacent intensity meshes, the elementary intensity pattern being such that it introduces a variation of intensity from a secondary beam crossing the elementary intensity pattern between a maximum value of 100% at the centre of the elementary pattern of surface S and a minimum value of 0% on the apexes of the pattern, and the elementary phase pattern being such that it introduces a phase shift close to $2\pi/3$ (modulo $2\pi$) between two secondary beams crossing two adjacent elementary intensity patterns.

A preferred intensity two-dimensional grating according to the invention has a hexagonal elementary intensity pattern the transmission surface of which is close to 66% of the elementary intensity mesh surface.

BRIEF DESCRIPTION OF THE DRAWINGS

Further features and advantages of the invention will be apparent from the following particular description and the appended drawings, wherein.

DETAILED DESCRIPTION

Figure 1A:
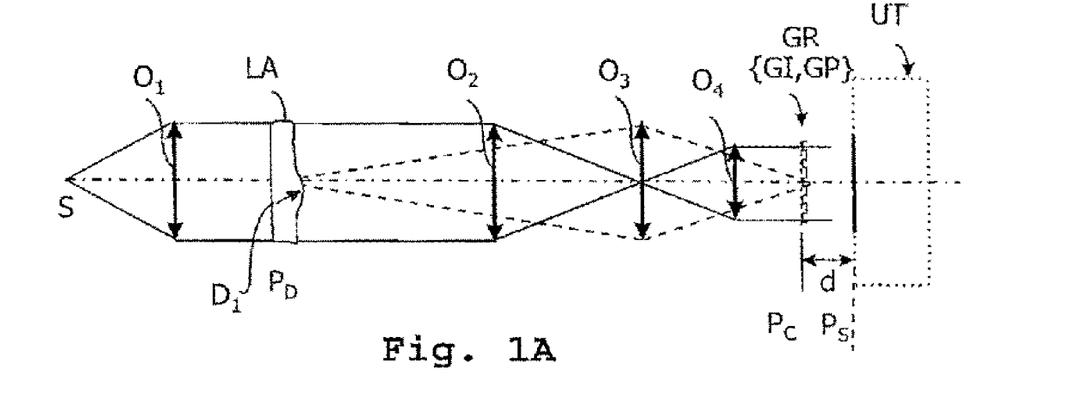
FIG. 1A is a theoretical optical diagram of a system for implementing the invention for checking optical components.
Figure 1B:
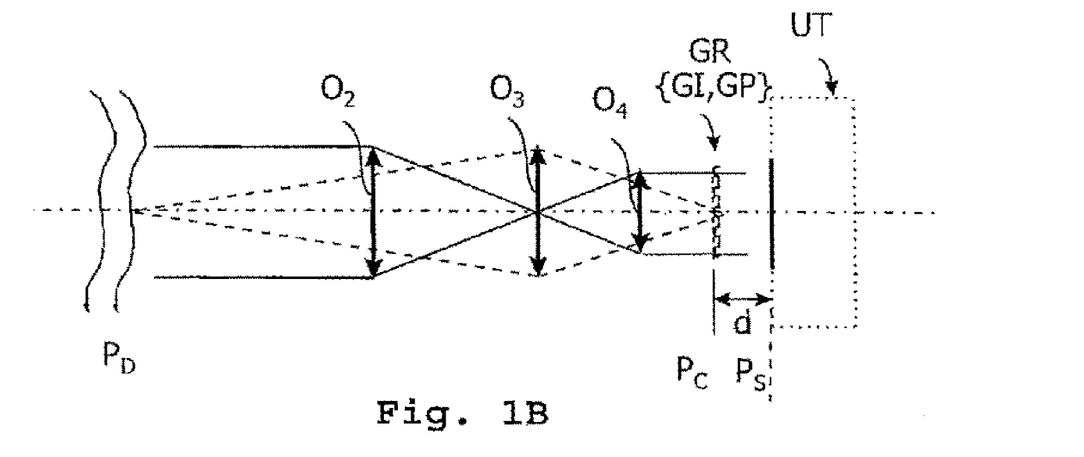
FIG. 1B is a theoretical optical diagram of a system for implementing the invention for measuring turbulent media such as the terrestrial atmosphere being crossed by a beam from a polychromatic source such a star.

FIGS. 1A and 1B show two examples of systems for implementing the invention.

On FIG. 1A, a source $S_o$ of polychromatic light is located at the focus of a collimating lens $O_1$. The parallel light beam coming from the lens $O_1$ illuminates a sample to be tested, which is diagrammatically represented as a plate LA with parallel faces, arranged in the plane $P_D$, and having a planarity defect $D_1$. The sample can be any other optical system (a lens or a mirror, in particular, a telescope mirror), or even simply a region in a gas medium being disturbed by a flow, for example.

In the case of an application in the astronomy field, a system for implementing the invention is illustrated on FIG. 1B. A planar wave from a very distant source, such a star, for example crosses a turbulent medium whose index variations are represented by sinuous lines.

An input arrangement performs the optical adaptation necessary for implementing the method according to the invention.

Such an adaptation is preferably achieved by an afocal system consisting in two lenses $O_2$ and $O_4$, with a field lens $O_3$ at an intermediary position. Such an afocal system has the function of, on the one hand, matching the diameter of the beam analyzed in the plane $P_D$, to the dimensions of the two-dimensional grating arranged in a plane $P_C$, and, on the other hand, conjugating the plane $P_D$ where the defect to be analyzed optically with the plane $P_C$.

Other means achieving such an optical conjugation between such two planes can also be suitable.

A diffraction grating GR adapted for achieving the combination of intensity and phase functions is arranged in the analysis plane $P_C$. Materially, such a grating can be constructed as for example those on FIG. 5A or 5B. It is the particular combination of functions that characterizes the grating of the invention rather than a particular embodiment.

In the example of the embodiment shown, the diffraction grating GR is made up of a two-dimensional intensity grating GI and a two-dimensional phase grating GP.

The intensity grating GI implements an intensity function FI which defines a hexagonal meshing of sub-pupils transmitting the light from the beam to be analyzed into a plurality of secondary beams.

The phase grating GP implements a phase function FP which introduces an mean phase shift between two adjacent secondary beams close to $2\pi/3$ (modulo $2\pi$).

The order in which the two functions are effected in the plane is of no importance.

According to the invention, the interferogram is made up of a hexagonal meshing of spots.

The plane $P_C$ is a zero sensitivity plane. The observation is effected in a plane $P_S$ located at a chosen observation distance d from the plane $P_C$.

The dynamics and the sensitivity of the system vary with the observation distance. Thus if d is zero, the observation plane $P_S$ is coincident with the analysis plane $P_C$ in which the grating is located and the sensitivity is zero.

Generally, an additional means of observing the plane $P_S$, comprising, for example, a lens, which optically conjugates the plane PS and a more accessible working plane, can be used.

Figure 2A:
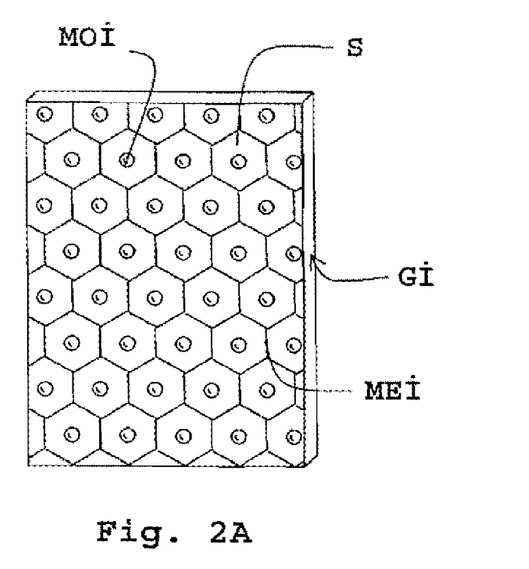
FIG. 2A illustrates a two-dimensional grating GI with a hexagonal meshing with a surface S.
Figure 2B:
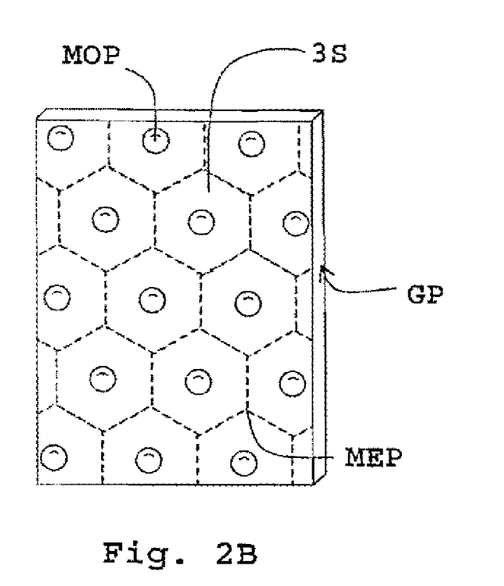
FIG. 2B illustrates a two-dimensional grating GP with a hexagonal meshing with a surface 3S.

FIGS. 2A and 2B show elementary meshes of the two-dimensional gratings, the patterns being represented serving as an illustration. The patterns of the invention are shown in FIGS. 3A, 3B, 4A, and 4B.

FIG. 2A shows a two-dimensional intensity grating GI having a hexagonal meshing characterized by a hexagonal elementary mesh with a surface S. FIG. 2B shows a two-dimensional phase grating GP having a hexagonal meshing characterized by a hexagonal elementary mesh with a surface 3S. The meshing, shown as broken lines, is not necessarily visible in the final grating. In each mesh of GI, a pattern MOI introducing intensity variations into the incident light beam is shown. In each mesh of GP, a pattern MOP introducing phase variations into the incident light beam is shown.

Figure 2C:
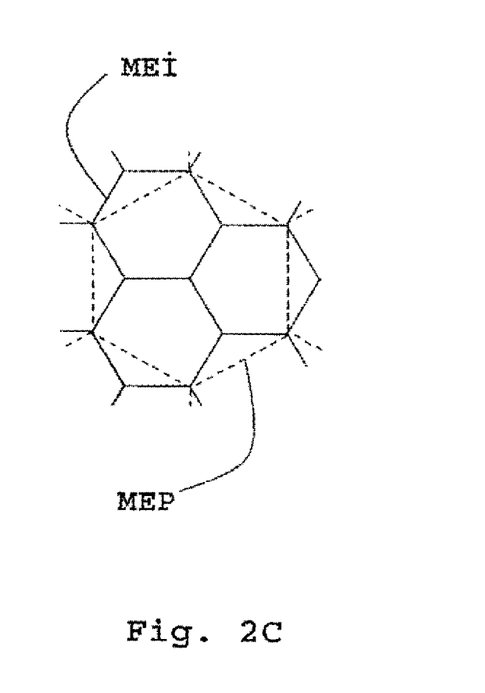
FIG. 2C illustrates the relative positioning of elementary intensity meshes MEI and elementary phase meshes MEP according to the invention.

FIG. 2C shows the relative positioning of elementary meshes of both gratings. This positioning is essential for a good operation of the invention. The surface of the elementary phase mesh MEP is equal to three times the surface of the elementary intensity mesh MEI. In order to facilitate the description of the relative positioning of hexagonal elementary meshes, a large diagonal of a hexagon is defined as linking two opposite apexes and a small diagonal is defined as linking two non adjacent and non opposed apexes. The phase mesh MEP is centred on the common apex of three adjacent intensity meshes MEI. The apexes of a phase mesh MEP match with the apexes located at one of the ends of the six small diagonals of three adjacent intensity meshes MEI. The other end of said small diagonals is located at the common apex of said three adjacent intensity meshes, i.e. at the centre of the phase mesh MEP.

Figure 3A:
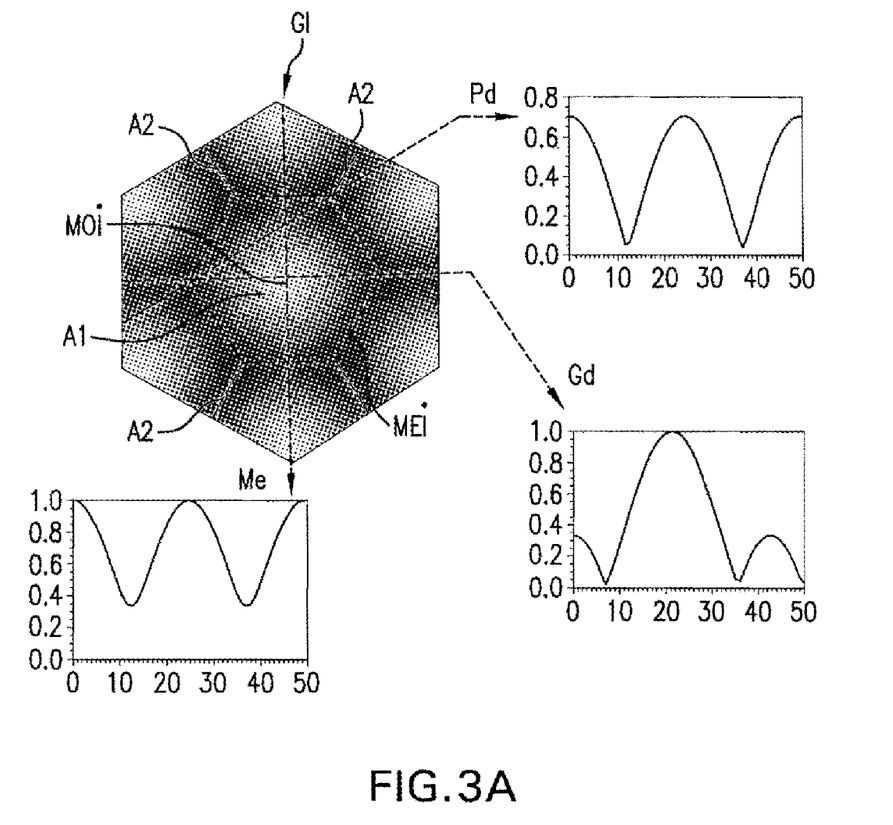
FIG. 3A illustrates a first example of an elementary pattern of an intensity grating useful in the invention.
Figure 3B:
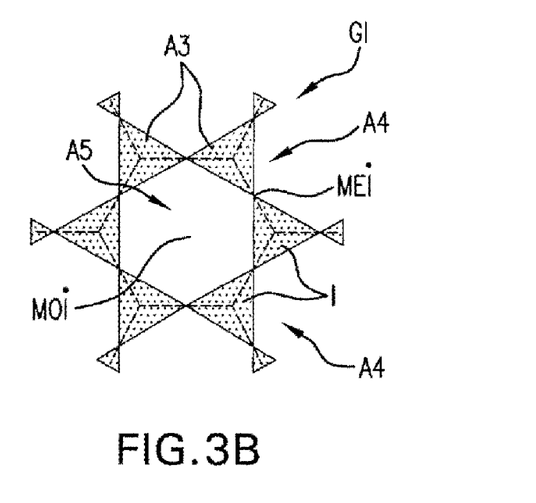
FIG. 3B illustrates a second example of an elementary pattern of an intensity grating useful in the invention.

FIGS. 3A and 3B show examples of elementary patterns for the GI two-dimensional intensity grating on FIG. 2A allowing for performing the intensity function according to the method of the invention.

FIG. 3A illustrates an elementary pattern MOI of a grating GI with a hexagonal meshing MEI of surface S having a continuously variable opacity. The lightest areas A1 at the centre of the pattern are those where the transparency is highest, and the dark areas A2 in the periphery are characterized by a higher opacity. The area of the sub-pupil can be defined here as the area where the transmission is higher than 33% of the maximum value of the grating transmission. A means for characterizing this grating comprises defining the transmission profiles over a period T along the directions of a small diagonal Pd and a median Me, and the period T' along the direction of a large diagonal Gd of the intensity mesh. The corresponding values are indicated in the appended table at the end of the description. The intensity grating GI obtained from such an elementary pattern is the ideal intensity grating. It makes it possible producing an interferometer with metrological qualities equivalent to those obtained with the spatial filtering as described in FR 2 712 978 but with a much simpler implementation.

FIG. 3B illustrates an elementary pattern MOI of a Ronchi type grating GI having a hexagonal meshing MEI with a surface S. The dotted areas A3 have a zero transmission and the light areas A4 are transparent. The elementary pattern MOI comprises a central transparent hexagonal area A5 whose apexes are located at the middle of the sides of the hexagon of the elementary intensity mesh, and six opaque peripheral isosceles triangles I. The apexes of each isosceles triangle are the centers of two adjacent sides and the common apex for said two sides. Thus, the maximum transmission surface of the sub-pupil is close to 67% of the surface of the elementary mesh. The light yield is thus substantially improved in comparison with intensity masks with rectangular or hexagonal meshes, more particularly those shown on FIG. 8 of French patent 2 712 978. This embodiment less expensive than the previous one is particularly valuable for common applications, more particularly with polychromatic light.

The elementary intensity patterns are such that they introduce an intensity variation of the secondary beam crossing them lying between a maximum value of 100% at the centre of the hexagonal pattern with a surface S and a minimum value of 0% on the apexes of said pattern.

Figure 4A:
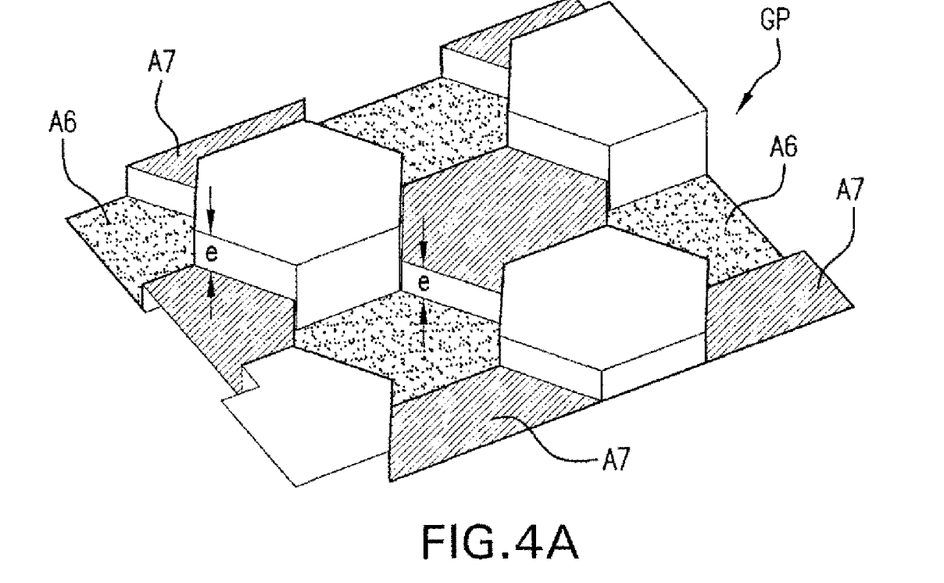
FIG. 4A illustrates an example of a phase grating with a hexagonal meshing useful in the invention FIG. 4B indicates the relative position of the elementary phase mesh and the corresponding phase pattern.
Figure 4B:
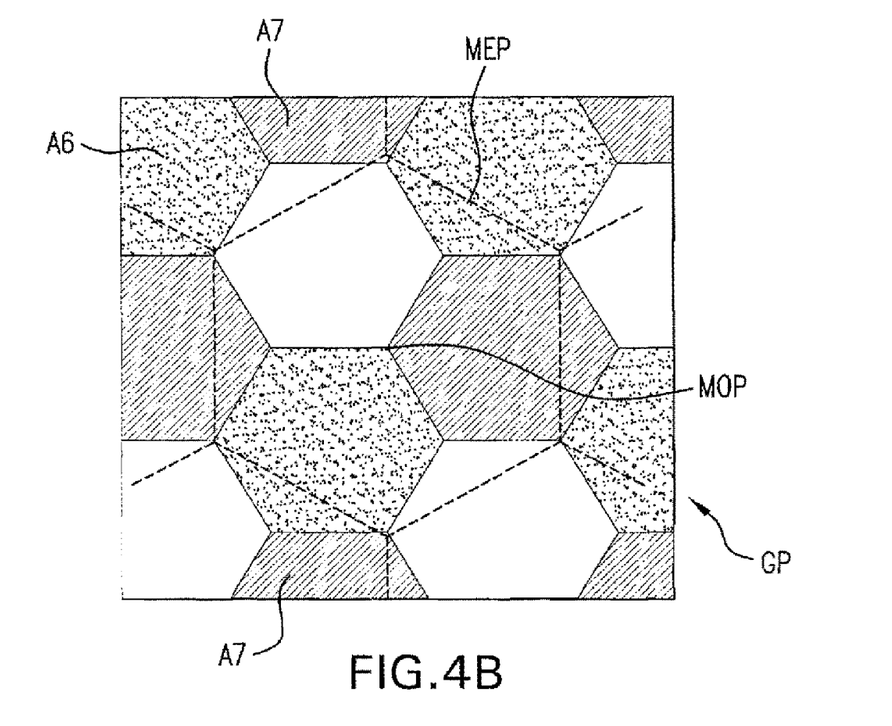

FIG. 4A shows a perspective view of one example of a two-dimensional phase grating GP which offers a simple means of implementing the phase function according to the method of the invention. FIG. 4B shows the same grating GP, observed along an axis perpendicular to the plane of the grating, onto which the elementary meshing with a surface 3S is represented in black broken lines. The grating GP of the checkerboard type has stepped periodic thickness variations so that the thickness difference e between two adjacent steps satisfies the equation:

$$e = \lambda/(n-1) \times (k+\tfrac{1}{3})$$

where $\lambda$ is the mean operating wavelength, n is the refractive index of the material when the phase grating is used in transmission mode, and k is an integer.

On FIG. 4B, there can be seen that the pattern MOP of the hexagonal checkerboard type in the phase grating GP overlaps the meshing of the intensity grating. The various levels of the checkerboard in the grating GP in this figure shown by the dotted areas A6 and the slanted-line areas A7 only illustrate thickness variations of the various steps of the grating, in no means the transmission variations between the steps. This grating is transparent in transmission mode.

An advantageous means of implementing the two-dimensional gratings GI and GP is to use the masking and photolithography etching techniques widely used in the semiconductor industry; GI can thus be implemented by depositing a metallic mask onto a substrate wafer and GP by etching a substrate wafer. With these techniques it is possible to make using a two-dimensional phase and intensity grating which combines both FI and FP functions of GI and GP, respectively, from a single substrate wafer.

In addition, the recent developments in the field of photolithography allow for contemplating coding in grey levels of the intensity function. Such various levels of grey can be obtained coding various thicknesses of metallic mask or drilling the latter with small openings of a size lower than the analysis mean wavelength.

Other methods of implementing both functions FI and FP by gratings GI and GP can be contemplated, for example on the principle of registering interferograms on photosensitive plates so as to thereby achieve the production of holographic gratings. Similarly, the description of this invention has been provided within the scope of gratings operating in transmission mode. The one skilled in the art will be able to apply this invention to gratings operating in reflection mode.

Figure 5A:
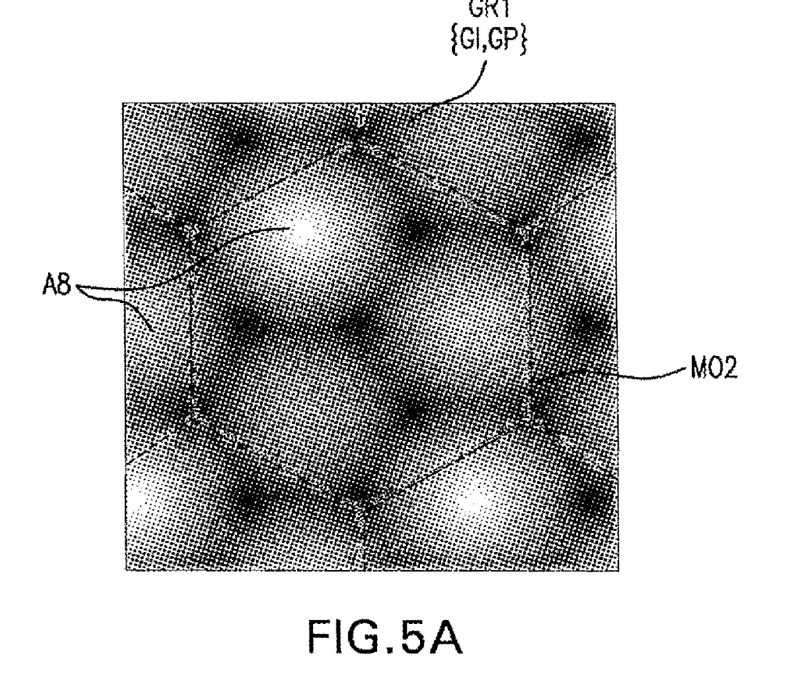
FIG. 5A illustrates a first example of a diffraction grating GR1 according to the invention.
Figure 5B:
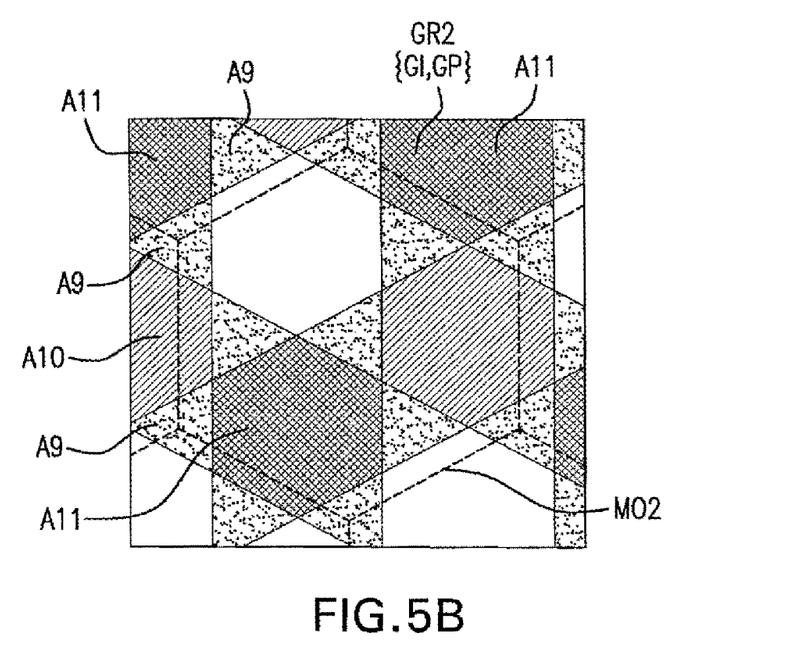
FIG. 5B illustrates a second example of a diffraction grating GR2 according to the invention.

The overlap of gratings GI and GP allows for producing two-dimensional gratings GR. FIG. 5A shows a grating GR1 obtained by overlapping the intensity grating having the pattern in FIG. 3A and the phase grating in FIG. 4A. FIG. 5B shows a grating GR2 obtained by overlapping the intensity grating having the pattern in FIG. 3B and the phase grating in FIG. 4B. For an appropriate understanding of FIG. 5A, there should be considered the effect linked to the various grey levels A8 of the GP grating checkerboards overlapping on that linked to the grating GI. For FIG. 5B, understanding is easier, dotted triangles A9 showing the opaque parts of the grating GI, the white hexagons and the stripped and cross-hatched hexagons A10 and A11, respectively, representing the various thicknesses of the GP grating steps.

Combining the gratings GI and GP allows for generating a meshing of light spots whose contrast is substantially independent of the observation distance d and the wavelength used. Because of the sudden intensity variations introduced by the intensity grating GI of the Ronchi type whose elementary pattern are shown in FIG. 3B, contrast fluctuations occur during the propagation which cause high-frequency local deformations of the light spots. Those unwanted deformations remain small compared to the sinusoidal intensity modulation observed in the two directions and do not disturb the analysis of the wavefront. A means for reducing such small fluctuations due to the residual energy diffracted in the secondary sub-beams comprises coding the intensity function using an intensity grating, the transmission of which is continuously variable between 100% at the centre of the mesh with a surface S and 0% on the edges, according to an apodization surface of the Hanning window type commonly encountered in digital signal processing.

In French patent application No. 2,682,761, a technique is proposed for acquiring and analyzing interference images obtained in order to reach gradients of the wavefront by means of a UT processing unit UT. Those techniques are directly applicable to the meshing of light spots obtained according to the present invention.

APPENDIX

Table of transmission index values

| Abscissa over a period | Large diagonal index Gd | Small diagonal index Pd | Median index Me |
|---|---|---|---|
| 1 | 0.000 | 0.000 | 0.327 |
| 2 | 0.069 | 0.052 | 0.334 |
| 3 | 0.147 | 0.091 | 0.352 |
| 4 | 0.230 | 0.131 | 0.378 |
| 5 | 0.314 | 0.171 | 0.411 |
| 6 | 0.399 | 0.210 | 0.448 |
| 7 | 0.483 | 0.249 | 0.488 |
| 8 | 0.564 | 0.286 | 0.530 |
| 9 | 0.642 | 0.323 | 0.573 |
| 10 | 0.714 | 0.358 | 0.616 |
| 11 | 0.781 | 0.391 | 0.658 |
| 12 | 0.840 | 0.423 | 0.699 |
| 13 | 0.891 | 0.454 | 0.739 |
| 14 | 0.933 | 0.482 | 0.776 |
| 15 | 0.965 | 0.509 | 0.811 |
| 16 | 0.987 | 0.533 | 0.844 |
| 17 | 0.998 | 0.556 | 0.875 |
| 18 | 1,000 | 0.576 | 0.902 |

APPENDIX-continued

Table of transmission index values

| Abscissa over a period | Large diagonal index Gd | Small diagonal index Pd | Median index Me |
|---|---|---|---|
| 19 | 0.988 | 0.593 | 0.926 |
| 20 | 0.967 | 0.609 | 0.947 |
| 21 | 0.935 | 0.622 | 0.965 |
| 22 | 0.893 | 0.632 | 0.979 |
| 23 | 0.843 | 0.640 | 0.990 |
| 24 | 0.784 | 0.645 | 0.997 |
| 25 | 0.718 | 0.647 | 1.000 |
| 26 | 0.646 | 0.647 | 1.000 |
| 27 | 0.568 | 0.645 | 0.996 |
| 28 | 0.487 | 0.639 | 0.989 |
| 29 | 0.403 | 0.631 | 0.978 |
| 30 | 0.318 | 0.621 | 0.964 |
| 31 | 0.234 | 0.608 | 0.946 |
| 32 | 0.151 | 0.592 | 0.924 |
| 33 | 0.073 | 0.574 | 0.900 |
| 34 | 0.000 | 0.554 | 0.873 |
| 35 | 0.079 | 0.532 | 0.842 |
| 36 | 0.141 | 0.507 | 0.809 |
| 37 | 0.197 | 0.480 | 0.774 |
| 38 | 0.244 | 0.452 | 0.736 |
| 39 | 0.282 | 0.421 | 0.696 |
| 40 | 0.310 | 0.389 | 0.655 |
| 41 | 0.327 | 0.355 | 0.613 |
| 42 | 0.334 | 0.320 | 0.570 |
| 43 | 0.330 | 0.284 | 0.527 |
| 44 | 0.315 | 0.246 | 0.485 |
| 45 | 0.290 | 0.208 | 0.445 |
| 46 | 0.254 | 0.168 | 0.408 |
| 47 | 0.209 | 0.129 | 0.376 |
| 48 | 0.156 | 0.088 | 0.350 |
| 49 | 0.086 | 0.049 | 0.334 |
| 50 | 0.000 | 0.000 | 0.327 |

What is claimed is:

1. A grating system for analyzing the wavefront of a light beam, comprising:
    (a) a two-dimensional intensity grating with hexagonal elementary meshes each having a surface where there is arranged an elementary intensity pattern with said elementary intensity mesh surface; and
    (b) a two-dimensional phase grating with hexagonal elementary meshes each having a surface equal to three times said elementary intensity mesh surface, where there is arranged an elementary phase pattern having a surface equal to three times said elementary intensity mesh surface;
    (c) all six apexes of an elementary phase mesh matching with the apexes located at one of the ends of the six small diagonals of three adjacent elementary intensity meshes, the other end of said small diagonals being located at the common apex of said three adjacent elementary intensity meshes;
    (d) said elementary intensity pattern being such that it introduces a variation of intensity from a secondary beam crossing said elementary intensity pattern between a maximum value of 100% at the center of said elementary intensity pattern, and a minimum value of 0% on the apexes of said elementary intensity pattern;
    (e) said elementary phase pattern being such that it introduces a phase shift close to $2\pi/3$ (modulo $2\pi$) between two secondary beams crossing two adjacent elementary intensity patterns.

2. A system for analyzing the wavefront of a light beam, including:
    (a) input optics means optically conjugating a reference plane with a plane wherein said wavefront is analyzed;
    (b) a diffraction grating comprising;
        (1) a two-dimensional intensity grating having hexagonal elementary meshes, and
        (2) a two-dimensional phase grating having hexagonal elementary meshes, and
        (3) said diffraction grating being arranged in said reference plane, resulting in a diffraction of said beam in a plurality of emerging beams referred to as secondary beams, and
    (c) means for observing an image formed by interference of said emerging beams in a plane located at a chosen distance from said reference plane, said image having deformations linked to gradients of the analyzed wavefront,
    (d) each of said elementary intensity meshes having a surface where there is arranged an elementary intensity pattern with said elementary intensity mesh surface,
    (e) each of said elementary phase meshes having a surface equal to three times said elementary intensity mesh surface, where there is arranged an elementary phase pattern having a surface equal to three times said elementary intensity mesh surface,
    (f) all six apexes of an elementary phase mesh matching with the apexes located at one of the ends of the six small diagonals of three adjacent elementary intensity meshes, the other end of said small diagonals being located at the common apex of said three adjacent elementary intensity meshes,
    (g) said elementary intensity pattern being such that it introduces a variation of intensity from a secondary beam crossing said elementary intensity pattern between a maximum value of 100% at the centre of said elementary intensity pattern and a minimum value of 0% on the apexes of said elementary intensity pattern,
    (h) said elementary phase pattern being such that it introduces a phase shift close to $2\pi/3$ (modulo $2\pi$) between two secondary beams crossing two adjacent elementary intensity patterns.

3. A system according to claim 1, wherein said elementary intensity pattern of said intensity grating has transmission profiles over a period along the directions of a small diagonal (Pd) and a median (Me) of said elementary intensity mesh, and a period along the direction of a large diagonal (Gd) of said elementary intensity mesh whose index values are the following ones:

| Abscissa over a period | Large diagonal index Gd | Small diagonal index Pd | Median index Me |
|---|---|---|---|
| 1 | 0.000 | 0.000 | 0.327 |
| 2 | 0.069 | 0.052 | 0.334 |
| 3 | 0.147 | 0.091 | 0.352 |
| 4 | 0.230 | 0.131 | 0.378 |
| 5 | 0.314 | 0.171 | 0.411 |
| 6 | 0.399 | 0.210 | 0.448 |
| 7 | 0.483 | 0.249 | 0.488 |
| 8 | 0.564 | 0.286 | 0.530 |
| 9 | 0.642 | 0.323 | 0.573 |
| 10 | 0.714 | 0.358 | 0.616 |
| 11 | 0.781 | 0.391 | 0.658 |
| 12 | 0.840 | 0.423 | 0.699 |
| 13 | 0.891 | 0.454 | 0.739 |
| 14 | 0.933 | 0.482 | 0.776 |
| 15 | 0.965 | 0.509 | 0.811 |
| 16 | 0.987 | 0.533 | 0.844 |

-continued

| Abscissa over a period | Large diagonal index Gd | Small diagonal index Pd | Median index Me |
|---|---|---|---|
| 17 | 0.998 | 0.556 | 0.875 |
| 18 | 1.000 | 0.576 | 0.902 |
| 19 | 0.988 | 0.593 | 0.926 |
| 20 | 0.967 | 0.609 | 0.947 |
| 21 | 0.935 | 0.622 | 0.965 |
| 22 | 0.893 | 0.632 | 0.979 |
| 23 | 0.843 | 0.640 | 0.990 |
| 24 | 0.784 | 0.645 | 0.997 |
| 25 | 0.718 | 0.647 | 1.000 |
| 26 | 0.646 | 0.647 | 1.000 |
| 27 | 0.568 | 0.645 | 0.996 |
| 28 | 0.487 | 0.639 | 0.989 |
| 29 | 0.403 | 0.631 | 0.978 |
| 30 | 0.318 | 0.621 | 0.964 |
| 31 | 0.234 | 0.608 | 0.946 |
| 32 | 0.151 | 0.592 | 0.924 |
| 33 | 0.073 | 0.574 | 0.900 |
| 34 | 0.000 | 0.554 | 0.873 |
| 35 | 0.079 | 0.532 | 0.842 |
| 36 | 0.141 | 0.507 | 0.809 |
| 37 | 0.197 | 0.480 | 0.774 |
| 38 | 0.244 | 0.452 | 0.736 |
| 39 | 0.282 | 0.421 | 0.696 |
| 40 | 0.310 | 0.389 | 0.655 |
| 41 | 0.327 | 0.355 | 0.613 |
| 42 | 0.334 | 0.320 | 0.570 |
| 43 | 0.330 | 0.284 | 0.527 |
| 44 | 0.315 | 0.246 | 0.485 |
| 45 | 0.290 | 0.208 | 0.445 |
| 46 | 0.254 | 0.168 | 0.408 |
| 47 | 0.209 | 0.129 | 0.376 |
| 48 | 0.156 | 0.088 | 0.350 |
| 49 | 0.086 | 0.049 | 0.334 |
| 50 | 0.000 | 0.000 | 0.327. |

4. A system according to claim 1, wherein the elementary intensity pattern comprises a central transparent hexagonal area whose apexes are located at the middle of the sides of the hexagon of said elementary intensity mesh, and six opaque peripheral isosceles triangles whose apexes are the centres of two adjacent sides of the hexagon of said elementary intensity mesh and the common apex for said two adjacent sides.

5. A system according to claim 1, wherein said phase grating has a checkerboard pattern overlapping said elementary intensity meshes and having stepped periodic thickness variations so that the thickness e between two adjacent steps satisfy the equation:

$$e = \lambda/(n-1) \times (k + 1/3)$$

where $\lambda$ is a mean operating wavelength, n is the refractive index of the material of the diffraction grating, and k is an integer.

* * * * *